April 15, 1930.  J. T. COX  1,754,266
FLAKE FORMING METHOD
Filed May 22, 1926   2 Sheets-Sheet 2
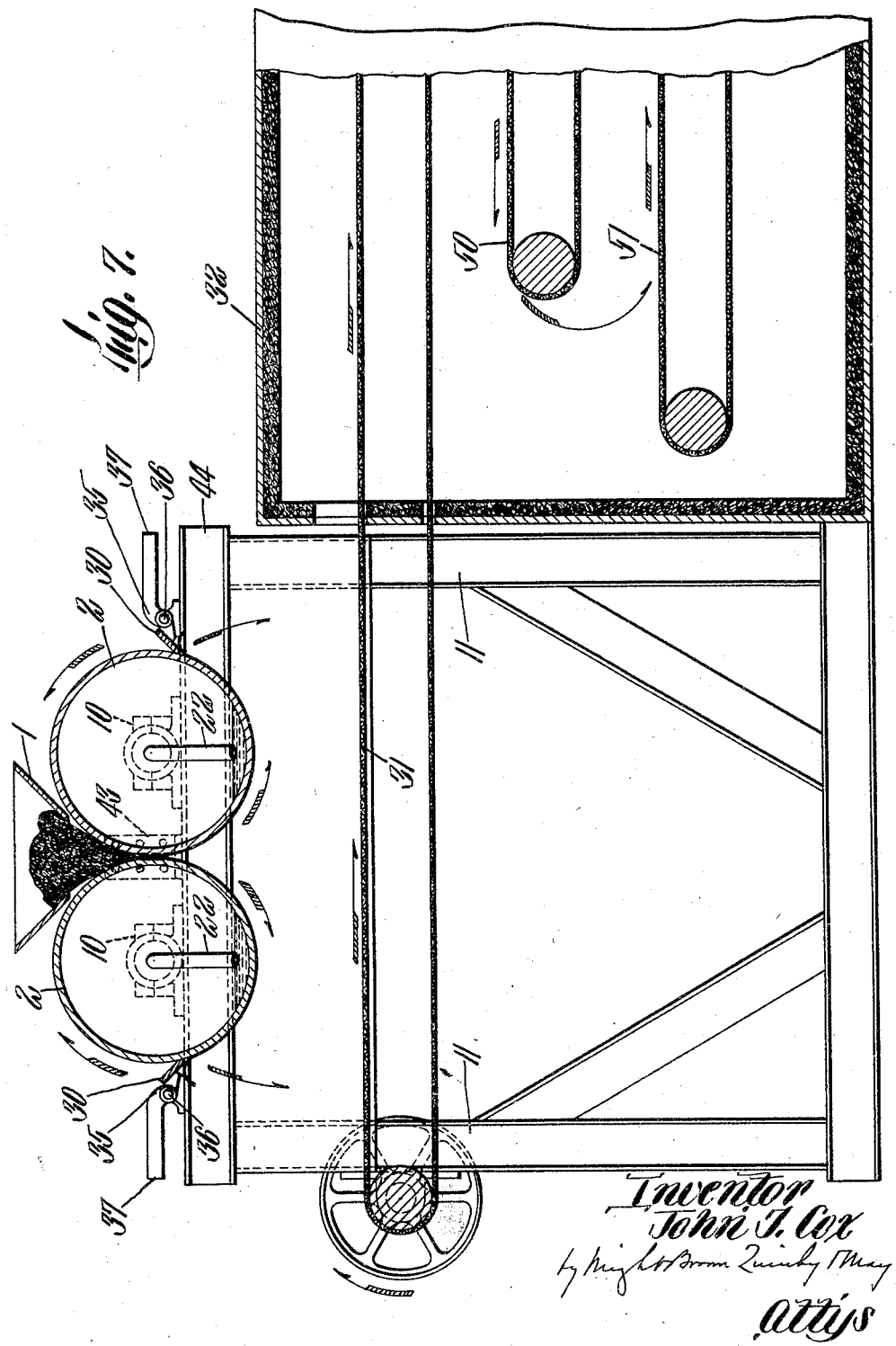

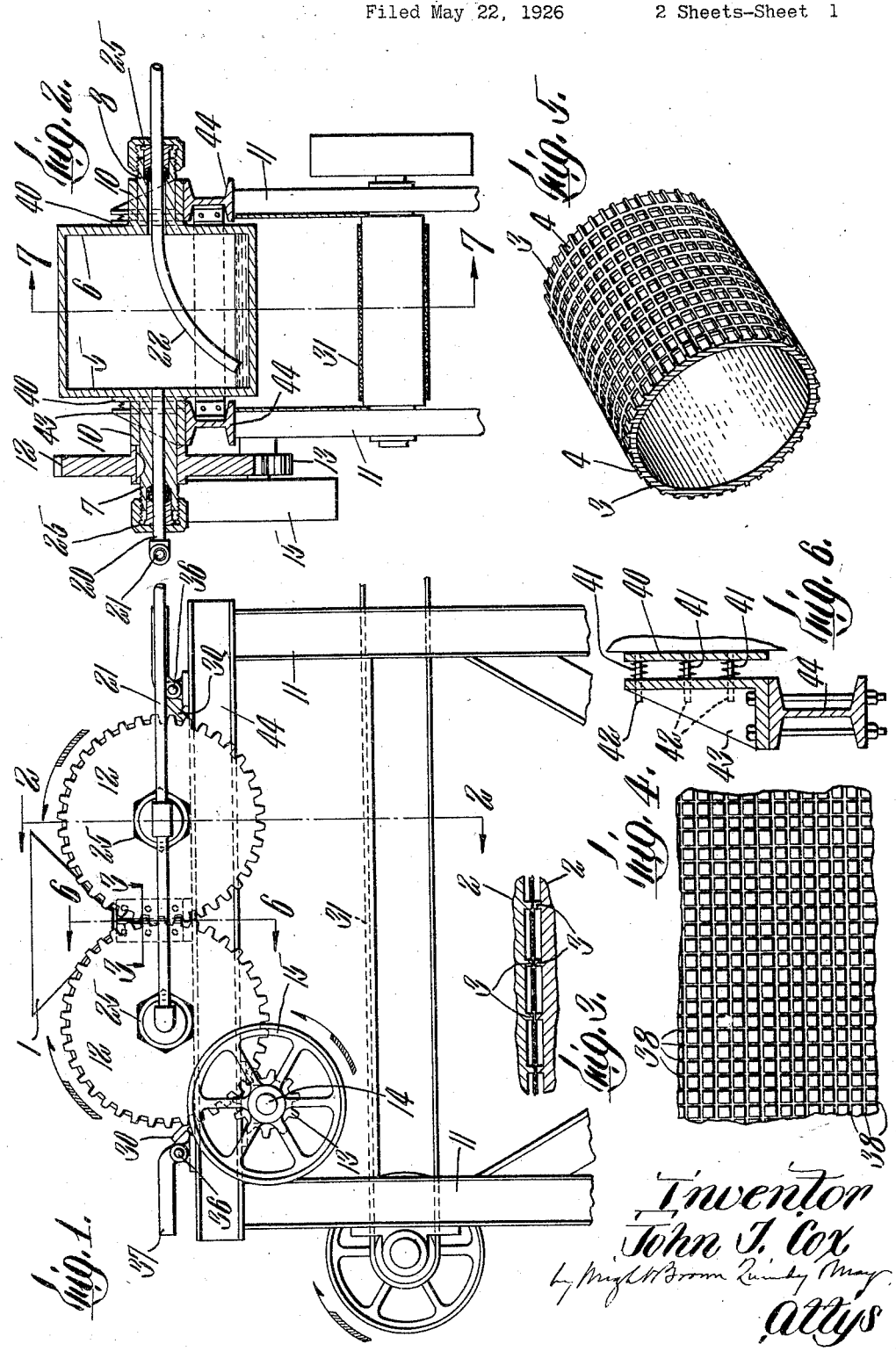

Patented Apr. 15, 1930

1,754,266

UNITED STATES PATENT OFFICE

JOHN T. COX, OF BERLIN, NEW HAMPSHIRE, ASSIGNOR TO BROWN COMPANY, OF BERLIN, NEW HAMPSHIRE, A CORPORATION OF MAINE

FLAKE-FORMING METHOD

Application filed May 22, 1926. Serial No. 110,840.

This invention relates to a method and mechanism for forming a flaked food from dough and while not restricted to such use has been more particularly designed for the manufacture of a food product made from peanuts. Such a product may be made by crushing peanut meats with their brown skins, removing the oil as by extraction with a suitable solvent as naphtha or ether, removing the brown skins as by passing the dry extracted meats past an exhaust nozzle, reducing the residue to flour and then forming the flour into a dough with water and any other desired ingredients as in a dough mixer. This dough is then subjected to the method of the present invention in the machine by which it is formed into flakes and then baked.

For a more complete understanding of this invention, reference may be had to the accompanying drawings in which Figure 1 is a side elevation of the flake forming and drying portions of the machine.

Figures 2 and 3 are detail sections on lines 2—2 and 3—3, respectively, of Figure 1.

Figure 4 is a plan of a portion of a dough sheet as formed by certain rolls of the machine.

Figure 5 is a perspective of a section of the roll.

Figure 6 is a detail section at one side of the machine on line 6—6 of Figure 1.

Figure 7 is a section on line 7—7 of Figure 2, but showing a portion of the baking oven.

The dough to be treated is placed in a suitable hopper indicated at 1 in Figures 1 and 7, this hopper leading the dough to the nip between a pair of rolls 2. As shown each of these rolls comprises a hollow cylinder having a surface portion formed with ribs 3 extending circumferentially and axially to divide the surface into a plurality of small depressed portions 4 quite similar in appearance to the baking surface of a waffle iron except that the ribs should be of relatively low relief. These drums have end walls 5 and 6 as shown in Figure 2, each of these walls having a hollow trunnion as 7 and 8 extending axially therefrom, these being journaled in suitable bearings as 10 carried by a machine frame 11. Outwardly of its bearings 10 each of the trunnions 7 has keyed thereto a gear 12, the gears 12 of the two trunnions 7 intermeshing as shown in Figure 1. A pinion 13 meshing with one of the gears 11 is carried by a transversely arranged shaft 14 to which also is fixed a belt pulley 15 by which the shaft 14 may be driven thus to impart rotation in opposite directions to the rolls 2 so as to feed the dough coming from the hopper 1 through the nip between them. The dough in a relatively sticky condition passing through the nip between the rolls is pressed out into general sheet form, but where the surfaces of the rolls separate below their nip the adherence of the material to each of these rolls causes the sheet to be split, a portion traveling around with each of the rolls 2.

The rolls are heated in order to dry out the dough adhering thereto, and, if desired, partially at least, cook this dough. For this purpose steam may be admitted to the interiors of the rolls as by pipes 20 passing through the trunnion 7 and leading from a steam supply pipe 21 (see Figures 1 and 2). The condensate may be removed as by means of pipes 22 having their inner ends extending downwardly toward the lower portions of the interiors of the drums and extending out therefrom through the hollow trunnions 8. Preferably at both these trunnions are stuffing boxes as 25 to maintain fluid tight connection between the pipes and the rotary trunnions. The steam entering through the pipes 21 acts to force out from the pipes 22 such condensate as may accumulate in the lower parts of the drums as soon as it reaches a sufficient height to enter the lower ends of the pipes 22.

As the dough follows around on the surfaces of the rolls and becomes dried and perhaps partially baked, it detaches itself from the roll surfaces sufficiently to pass outwardly of a pair of doctors at 30 as shown in Figure 7, these doctors completing the detachment of the layers of dough from the rolls and causing them to break apart substantially along the lines formed by the ribs 3 into flakes or particles which drop upon a belt 31 by which they are carried into a baking oven shown at 32. The rolls 2 should be rotated slowly enough so that the dough is sufficiently dried by the time it reaches the doctors as to come away from the roll surfaces easily. The doctors 30 are held up against the peripheries of the rolls 2 and for this purpose, they are shown as attached to the inner ends of levers 35 pivoted at 36 to the frame 11 and having portions 37 extending outwardly of the pivot points sufficiently to overbalance the doctors and hold them yieldingly against the roll surfaces.

In Figure 3 is shown the manner in which the abutting surfaces of the rolls come together so that the mating ribs 3 thereon define score lines, as shown in Figure 4 at 38, which so weaken the layers of dough adhering to these rolls that when they reach the doctors 30 the layers break off along the score lines in flakes as hereinbefore described.

In order to limit the width of the sheet of dough passing between the rolls to the lengths of these rolls, means are provided for closing off the ends of the nip through which the dough passes. As shown best in Figure 6, each of these means comprises a plate 40 which is held by springs 41 surrounding guide pins 42 against the adjacent ends of the rolls and bridging the nip therebetween. These guide pins 42 for each plate slidably engage in perforations in a bracket 43 fixed to the upper member 44 of the frame 11.

The sheets of dough, reduced to flake form, and deposited on the belt 31 are passed into the oven 32 as hereinbefore described, and from this belt 31 they pass in succession to other belts 50 and 51 positioned within the oven, these belts acting to maintain the flakes in the oven for a sufficient length of time to properly cook them. The oven may be heated in any suitable way as by the burning of suitable fuel or by electric heating units placed beneath the upper stretches of the belts, and preferably the oven is maintained at a temperature sufficiently high to effect a quick cooking and toasting of the dough so as to make it crisp and tender.

The various belts are preferablly made of material such as wire gauze which will not be damaged by the heat and which will permit air currents to pass therethrough.

Having thus described an embodiment of this invention it should be evident that various changes and modifications might be made therein without departing from its spirit or scope as defined by the appended claim.

I claim:

The method of forming flakes from dough which comprises pressing and indenting the dough between surfaces to which the dough adheres in sheet form, drying the dough while it is in contact with said surfaces, progressively separating said surfaces thereby splitting the sheet of dough, stripping the dried dough from said surfaces whereby it breaks apart substantially along the lines of indentation forming flakes, and then baking the flakes.

In testimony whereof I have affixed my signature.

JOHN T. COX.